United States Patent Office 3,121,562
Patented Feb. 18, 1964

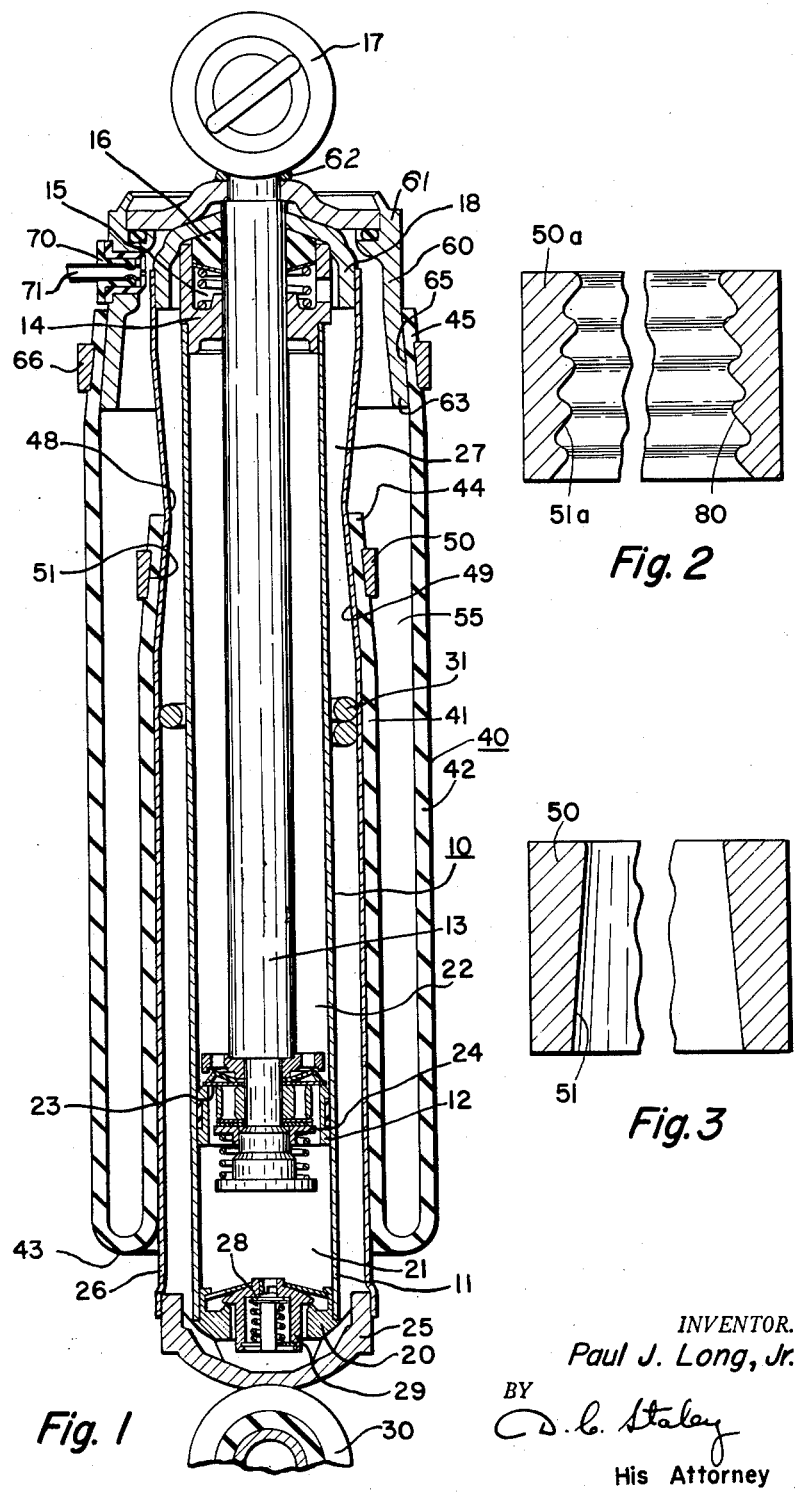

3,121,562
ATTACHMENT MEANS FOR AIR SPRING ON SHOCK ABSORBER
Paul J. Long, Jr., Dayton, Ohio, assignor to General Motors Corporation, Detroit, Mich., a corporation of Delaware
Filed Aug. 30, 1960, Ser. No. 52,880
4 Claims. (Cl. 267—64)

This invention relates to a combination shock absorber and supplementary air spring unit assembly adapted to be placed between the sprung mass and the unsprung mass of a vehicle in the same position in which a conventional direct acting shock absorber is normally disposed adjacent the main suspension spring for the vehicle, the supplementary air spring unit, when pressurized with a pressure fluid such as air, aiding the main spring in support of the sprung mass of the vehicle on the unsprung mass.

The combination shock absorber and supplementary air spring unit may be positioned adjacent each of the respective main springs of the vehicle, if desired, but are used primarily adjacent the two rear springs of the vehicle. The air spring on the shock absorber is constructed and arranged in a manner that it will not cause any substantial ride effect change in the normally engineered spring suspension for the vehicle. The air spring can be supplied with air or other suitable gas under pressure, whenever a heavier than normal load is carried by the vehicle so that the main suspension spring of the vehicle will be aided or helped in its suspension of the vehicle during the period of heavy load in the vehicle to increase thereby the overall load carrying capacity of the suspension system and resist "bottoming" of the vehicle and maintain the vehicle in a level condition relative to the road.

More particularly the invention relates to a means for attaching the free ends of a resilient tubular wall structure to the shock absorber in a manner that the free ends of the tubular structure will retain fluid-tight engagement with the wall portions of the shock absorber by merely retaining frictional engagement therewith so that the tubular wall structure can function, in cooperation with the shock absorber, as an air spring.

One of the problems to produce a shock absorber and air spring unit assembly as an economical unit of manufacture is that of providing satisfactory means for attaching end portions of an air spring to a shock absorber in a manner that will be economical and will maintain fluid-tight engagement of the end portions of the air spring with the shock absorber.

It is, therefore, an object of this invention to provide a shock absorber with an air spring unit wherein opposite free ends of a tubular resilient wall structure are retained in fluid-tight engagement with the walls of a shock absorber solely by frictional engagement, which frictional engagement will be increased in proportion to the pressure applied internally of the air spring unit portion of the shock absorber.

It is another object of this invention to provide a shock absorber and an air spring unit assembly incorporating the features of the foregoing object wherein the wall portion of the reservoir shell of the shock absorber and the wall portion carried by the reciprocating rod that extends from the shock absorber are each provided with angularly extending wall portions that extend axially of the shock absorber and have the configuration of truncated cones with opposite free end portions of the tubular resilient wall structure carried on the truncated conical portions of the respective wall portions of the shock absorber and attached thereto by non-elastic band members that surround the free ends of the resilient tubular wall structure.

Further objects and advantages of the present invention will be apparent from the following description, reference being had to the accompanying drawing wherein preferred embodiments of the invention are clearly shown.

In the drawings:

FIGURE 1 is a longitudinal cross-sectional view of a shock absorber and auxiliary air spring unit incorporating features of this invention.

FIGURE 2 is an enlarged cross-sectional view of a band to secure the air spring wall to the shock absorber.

FIGURE 3 is an enlarged cross-sectional view of another form of band to secure the air spring wall to the shock absorber.

In this invention, in FIGURE 1, there is illustrated a shock absorber and an air spring unit assembly adapted to be placed between the sprung mass and the unsprung mass of a vehicle in the same location that a conventional shock absorber is placed normally. The shock absorber will function in its normal manner to damp movements of the sprung and unsprung masses relative to one another without any substantial interference from the air spring unit portion of the assembly when the air spring is not pressurized. The air spring unit portion of the combination shock absorber and air spring unit assembly will aid the support of the sprung mass on the unsprung mass of the vehicle when pressure fluid, preferably air, is supplied into the air chamber of the air spring unit so that a greater load can be carried by the vehicle without causing sagging of the vehicle relative to the unsprung mass. The arrangement is such that the vehicle can be retained on substantially a level condition by proportioning the air pressure in the air spring unit of the shock absorber to the load in the vehicle. The air spring will not substantially affect the operation of the shock absorber when used as an air spring but it will aid the main suspension spring in supporting the sprung mass relative to the unsprung mass when an above normal load is carried in the vehicle.

The shock absorber 10 consists of a cylinder 11 having a valved piston 12 carried on the end of a reciprocating rod 13. The reciprocating rod 13 extends through a rod guide member 14 at one end of the cylinder 11, the rod guide member 14 having a rod seal chamber 15 that receives a rod seal 16 engaging the rod and sealing against loss of hydraulic fluid from within the shock absorber cylinder 11. The projecting end of the rod 13 carries a fitting 17 adapted to be attached to the sprung mass or chassis of the vehicle for securing this end of the shock absorber to the vehicle. The seal chamber 15 is closed by a cap member 18 that also holds the rod seal 16 within the chamber 15.

The bottom end of the cylinder 11 is closed by a base valve structure 20 so that a compression chamber 21 is formed between the base valve 20 and the piston 12 and a rebound chamber 22 is formed between the piston 12 and the rod guide 14.

The piston 12 is provided with a compression control valve 23 on one side of the piston which regulates flow of hydraulic fluid from the chamber 21 into the chamber 22 on movement of the piston 12 toward the base valve 20. On the opposite side of the piston 12 there is provided the rebound valve 24 that controls flow of hydraulic fluid from chamber 22 into the chamber 21 when the piston moves upwardly away from the base valve 20. The base valve 20 is carried in a closure cap 25 that is secured within one end of a reservoir tube 26 surrounding and spaced from the cylinder tube 11. The upper end of the reservoir tube 26 is fixedly attached to the closure cap 18, thereby providing a closed fluid reservoir space 27 between the cylinder tube 11 and the reservoir tube 26.

The base valve 20 has a valve member 28 that controls flow of hydraulic fluid from the compression chamber 21 into the reservoir chamber 27 on movement of the piston 12 towards the base valve 20. The base valve also includes a valve member 29 that provides for relatively free flow of hydraulic fluid from the reservoir chamber 27 back into the compression chamber 21 on movement of the piston 12 away from the base valve.

The closure cap 25 carries a fitting 30 that is adapted to secure the lower end of the shock absorber to the unsprung mass of the wheel and axle structure of the vehicle, the fitting members 30 and 17 thereby securing and locating the shock absorber and air spring unit assembly between the sprung mass and the unsprung mass of the vehicle in which condition the shock absorber 10 can function normally to provide for relative movement between the sprung mass and the unsprung mass and provide for damping control of this relative movement.

A baffle ring 31 is provided in the reservoir chamber 27 to reduce the frothing of oil in the reservoir chamber.

The air spring unit assembly 40 of the combination structure includes an inner wall portion 41 co-extensive with an outer wall portion 42, both wall portions of the same resilient flexible material, such as fabric reinforced rubber or other rubber-like material of uniform thickness, as shown in FIGURE 1. These wall portions 41 and 42 are connected by a return bend portion 43 that is integral with the wall portions 41 and 42 and is formed by these portions on relative reciprocation between the inner and the outer wall portions 41 and 42. Portions 44 and 45, respectively, of the inner and outer walls 41 and 42 are positioned so that the wall structure is looped as shown in FIGURE 1 of the drawing.

The reservoir tube 26 has a necked-down or reduced diameter portion 48 disposed near the end of the reservoir tube that is secured to the closure cap 18. This reduced diameter portion 48 of the reservoir tube 26 forms a truncated conical wall portion 49 that is engaged by the end portion 44 of the inner wall 41 of the flexible tubular wall structure.

To secure the end portion 44 of the wall portion 41 to the reservoir tube 26 in a fluid tight sealing engagement, a non-elastic metal band 50 is provided around the end portion 44 to frictionally retain the end portion in engagement with the reservoir 30. It will be noted from the drawings in FIGURE 1 and in FIGURE 3 that the inner diameter 51 of the metal band 50 is of lesser diameter than the diameter of the reservoir tube 26 in its cylindrical portion plus twice the thickness of the wall portion 41, but is greater than the diameter of the reservoir tube 26 taken by itself. Thus, the band 50 can be placed over the reservoir tube 26 from either end thereof into the area of the reduced diameter portion 48 of the reservoir tube 26 and then the end portion 44 of the wall 41 can be slipped onto the reservoir tube 26, whereafter the band 50 can be moved downwardly over the end portion 44 of the wall 41 to confine it into engagement with the conical wall portion 49 of the reservoir tube. Obviously, if the wall 41 of the flexible tubular wall structure tends to move axially towards the base valve of the shock absorber, such movement will cause the band 50 to grip the end portion 44 more strongly and increase the frictional pressure engagement of the end portion 44 with the reservoir tube wall portion 49. Thus, when fluid under pressure is admitted into the chamber 55 formed between the wall portions 41 and 42, the frictional pressure of engagement between the wall portion 44 and wall 49 will be in direct proportion to the pressure confined within the chamber 55.

The outer wall portion 42 of the tubular wall structure is the same as the inner wall portion 41 and has the co-extensive end wall portion 45 thereof carried on a wall member 61 that is fixedly attached to the rod 13 by a fluid tight seal 62 so that the walls 41 and 42 cooperate with the shock absorber structure to form a fluid pressure chamber 55.

This wall means or wall structure 61 has the annular wall portion 60 extending axially of the reservoir tube 26 in the direction of the base valve 20 so that the wall means 61 is substantially in the form of a cup-shaped member having an open ended axially extending portion 63.

The end portion 63 of the wall 60 has the configuration of a truncated cone, as represented by the wall surface portion 65. This truncated cone portion 65 of the wall 60 is engaged by the end portion 45 of the outer wall 42 of the tubular wall structure. The wall portion 45 is held in fluid-tight engagement with the truncated wall portion 65 by means of the non-elastic metal band 66 that has an inner diameter of lesser value than the maximum diameter of the truncated wall portion 65 plus twice the thickness of the wall 42. Thus, any axial force applied to the wall 42 by fluid pressure within the chamber 55 will tend to urge the band 66 to grip the wall portion 45 more strongly and increase frictional engagement between the end portion 45 and the wall surface 65 in direct proportion to the pressure within the chamber 55.

A suitable pressure fitting 70 is carried in the wall 60 to provide for admission of fluid under pressure into the chamber 55 and to provide for exhaust of fluid therefrom. This fitting 70 has the pressure line 71 extending therefrom connected with any suitable valve control designed for regulating pressure in the chamber 55.

FIGURE 3 is an enlarged view of the band 50 wherein the inner surface 51 of the band is illustrated as being in the form of a truncated cone that is a matching counterpart of the portion 49 of the shell of the shock absorber.

FIGURE 2 is an enlarged cross-sectional view of the modified form of the band, identified as 50a, wherein the inner surface 51a is provided with a plurality of serrations 80 in the form of annular rings that engage the end 44 of the inner wall 41 to retain the wall portions 44 on the portion 49 of the shell of the shock absorber.

While the embodiments of the invention as herein disclosed constitute preferred forms, it is to be understood that other forms might be adopted.

What is claimed is as follows:

1. A combined shock absorber and supplementary air spring unit comprising; a tubular direct acting shock absorber including an outer tubular shell having a closed end and an intermediate conical wall portion, a piston within said shell attached to a piston rod which extends outwardly of said shell through an opening therein at the end opposite to said closed end, said piston and piston rod being extensible as a unit with respect to said shell said piston rod carrying an attached conical wall portion thereon at the end opposite to the end that carries the piston, a tubular resilient wall structure having one end thereof fitting snugly over the outer conical surface of said shell, said wall structure being doubled back upon itself and having its other end fitting snugly over a conical portion of said piston rod which extends outwardly of said shell to form a generally concentric rolling diaphragm between said shell and said rod, and spaced apart band-like sealing means for positively and sealingly engaging the opposite ends of said tubular wall structure to said conical wall portion of said shell and to said conical wall portion on said piston rod.

2. The shock absorber and supplementary air spring unit claimed in claim 1 wherein the shell and the piston rod portion which are engaged by said resilient wall structure are of truncated conical shape for resisting displacement of said sealed ends of said resilient wall structure during relative movement between the piston and piston rod and the shell.

3. The shock absorber and supplementary air spring unit as claimed in claim 1 wherein the band-like sealing means are cylindrical, non-elastic bands having truncated conical inner wall surfaces.

4. The shock absorber and supplementary air spring unit as claimed in claim 1 including a fitting leading into the resilient wall structure whereby compressed air may be pumped into the structure by changing the relative positions of the shell and piston rod and the piston combination.

References Cited in the file of this patent

UNITED STATES PATENTS

| | | |
|---|---|---|
| 2,467,098 | Rossman | Apr. 12, 1949 |
| 2,880,020 | Audette | Mar. 31, 1959 |
| 2,916,296 | Muller | Dec. 8, 1959 |
| 2,925,265 | Nassimbene | Feb. 16, 1960 |
| 2,945,702 | Winklemann | July 19, 1960 |
| 3,053,528 | Stengelin | Sept. 11, 1962 |

FOREIGN PATENTS

| | | |
|---|---|---|
| 210,559 | Australia | Mar. 8, 1956 |
| 210,848 | Australia | Sept. 23, 1957 |
| 214,922 | Australia | May 2, 1958 |
| 218,802 | Australia | Nov. 21, 1958 |
| 946,950 | Germany | July 19, 1956 |
| 1,161,423 | France | Aug. 29, 1958 |